Oct. 11, 1966 J. H. VAN HORN 3,278,690

COMMUNICATION SYSTEM HAVING COMMON AMPLIFIER MEANS

Filed April 1, 1963 6 Sheets-Sheet 1

INVENTOR
JOHN H. VANHORN
BY
Mason, Kolehmainen, Rathburn and Wyss
ATTORNEYS.

Fig. 2 LINK CONNECTOR-200

Oct. 11, 1966 J. H. VAN HORN 3,278,690

COMMUNICATION SYSTEM HAVING COMMON AMPLIFIER MEANS

Filed April 1, 1963 6 Sheets-Sheet 3

Fig. 3 LINK CONNECTOR-200

COMMUNICATION SYSTEM HAVING COMMON AMPLIFIER MEANS

Filed April 1, 1963 6 Sheets-Sheet 4

Fig. 4 LINK CONNECTOR-200

Oct. 11, 1966 J. H. VAN HORN 3,278,690

COMMUNICATION SYSTEM HAVING COMMON AMPLIFIER MEANS

Filed April 1, 1963 6 Sheets-Sheet 5

Oct. 11, 1966 J. H. VAN HORN 3,278,690

COMMUNICATION SYSTEM HAVING COMMON AMPLIFIER MEANS

Filed April 1, 1963 6 Sheets-Sheet 6

United States Patent Office 3,278,690
Patented Oct. 11, 1966

3,278,690
COMMUNICATION SYSTEM HAVING COMMON AMPLIFIER MEANS

John H. Van Horn, Racine, Wis., assignor to Sta-Rite Industries, Inc., a corporation of Wisconsin
Filed Apr. 1, 1963, Ser. No. 269,330
18 Claims. (Cl. 179—18)

Figure 1:
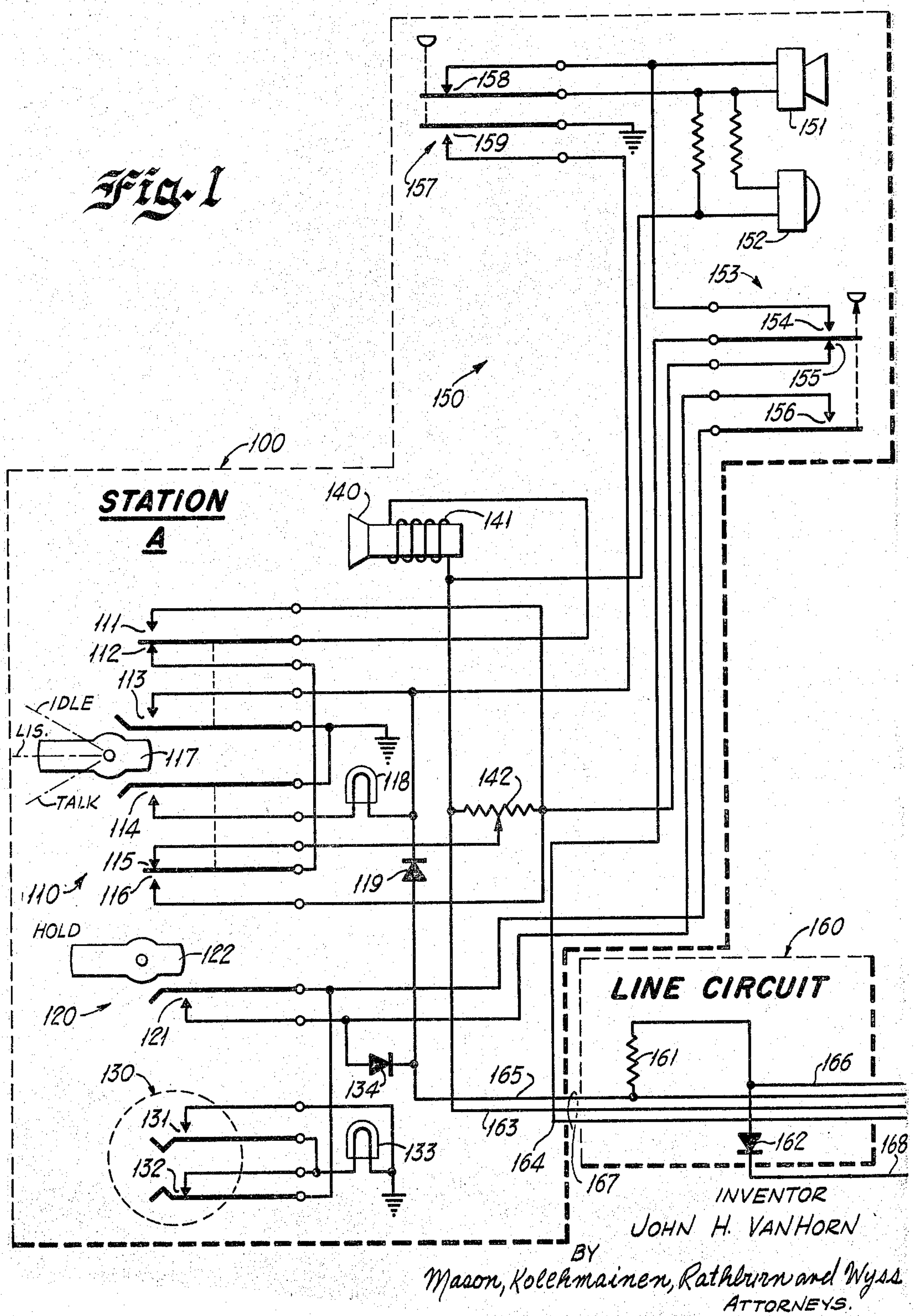

This invention relates to a communication system and, more particularly, to a dial controlled intercommunication system.

The intercommunication systems that are most commonly encountered are those in which a communication or voice path is extended over wired circuits selected by the manual actuation of one or more keys. These systems can include a number of separate amplifying means or, preferably, a single amplifier means common to a group of stations. With the demand for intercommunication systems of a greater capacity, the amount of wiring and other components required in conventional systems becomes excessive, and the system inherently does not possess the flexibility that is often desirable in large installations. Accordingly, it would be desirable to provide a system having a large number of intercommunication stations in which the cost and size of the equipment necessary to extend the number of paths required by traffic considerations is provided by a group of individually allotted links which are common to all of the stations and which are dial controlled. These links as well as the stations and voice and control circuits should contain a minimum number of components while retaining the ability to perform all the necessary telecommunication functions in addition to the switching operations required in large capacity systems.

Accordingly, one object of the present invention is to provide a new and improved intercommunication system.

Another object is to provide an intercommunication system including a plurality of link means for establishing communication paths between stations and new and improved means for controlling the operation of the link means.

A further object is to provide a dial controlled intercommunication system including a voice channel and a single control conductor to which direct current and selectively poled alternating signals are applied to control the establishment of a communication path between calling and called stations.

Another object is to provide an intercommunication system of the type including a plurality of link means each containing a common amplifier and new and improved means for controlling the operation of the common amplifier means in a seized link.

Another object is to provide a communication system including new and improved means for controlling the application of supervisory tones to calling and called stations.

A further object is to provide an intercommunication system having new and improved means for preventing eavesdropping.

A further object is to provide an intercommunication system including means for preventing transmission from a called station to a calling station until a talk-listen control in the calling station has been operated to a talk position at least once subsequent to the establishment of the connection.

A further object is to provide a communication system including new and improved means for monitoring the operability of signal transmitting components.

A further object is to provide a communication system of the type having allotted links which includes means for checking the operability of amplifying components in the links during their idle periods.

Figure 5:
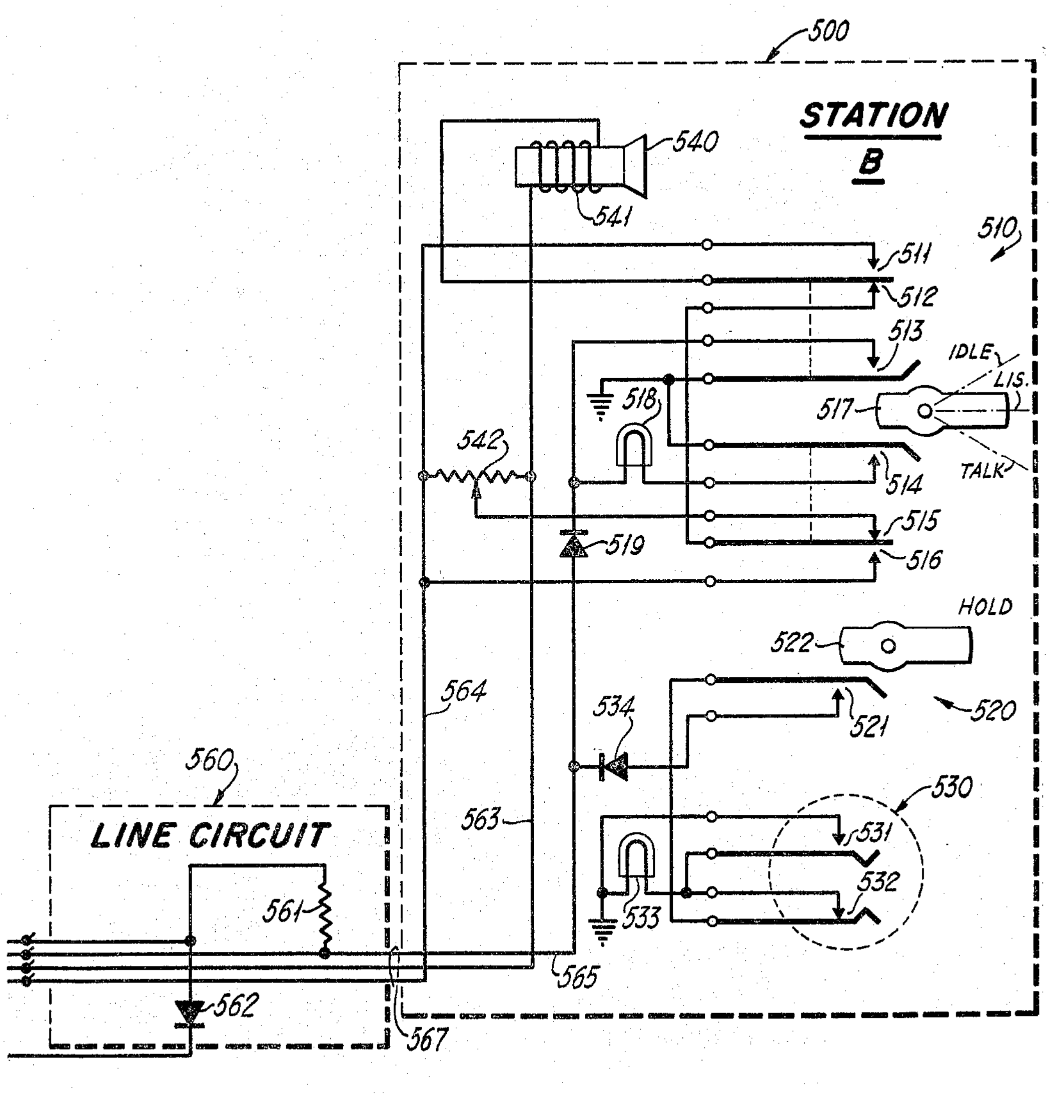
Figure 6:
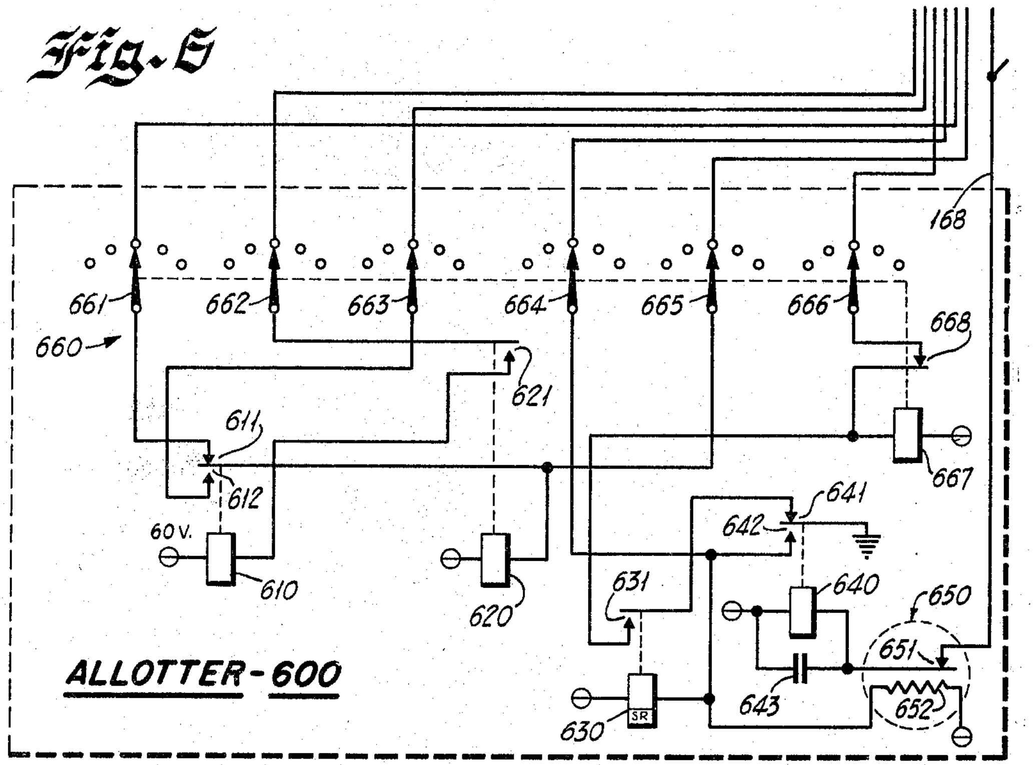
Figures 7, 8:
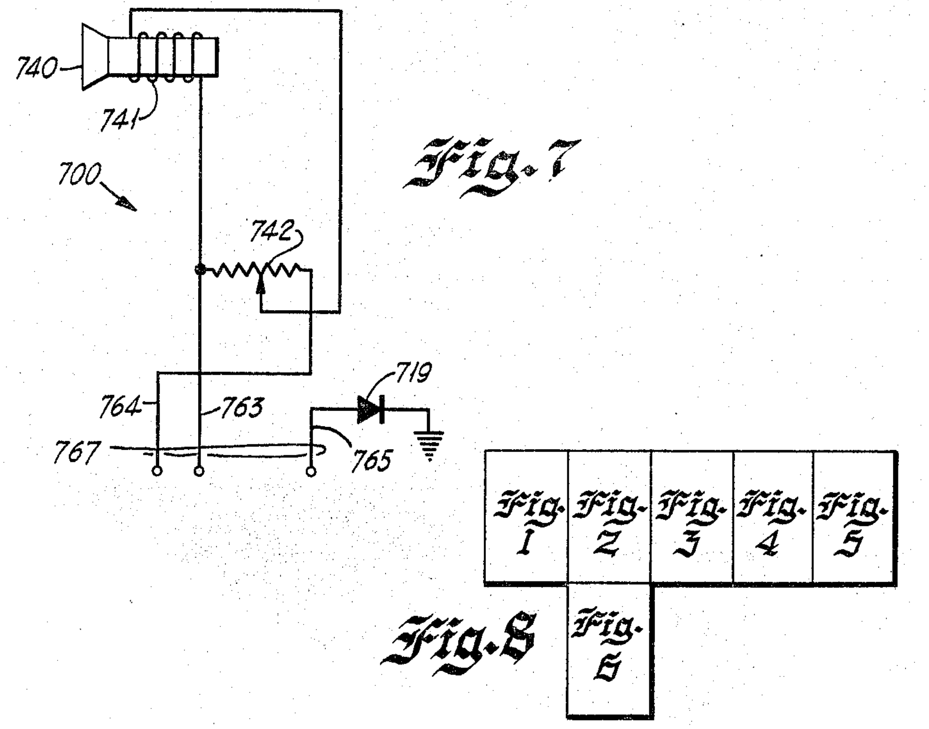

Many other objects and advantages of the present invention will become apparent from considering the following detailed description in conjunction with the drawings, in which:

FIGS. 1–6 form a schematic circuit diagram of a dial controlled intercommunication system embodying the present invention;

FIG. 7 is a schematic diagram of a modified form of station used in the system shown in FIGS. 1–6; and FIG. 8 is a block diagram illustrating the manner in which FIGS. 1–6 of the drawings are positioned adjacent each other to form a complete circuit diagram of a system embodying the present invention.

Figure 2:
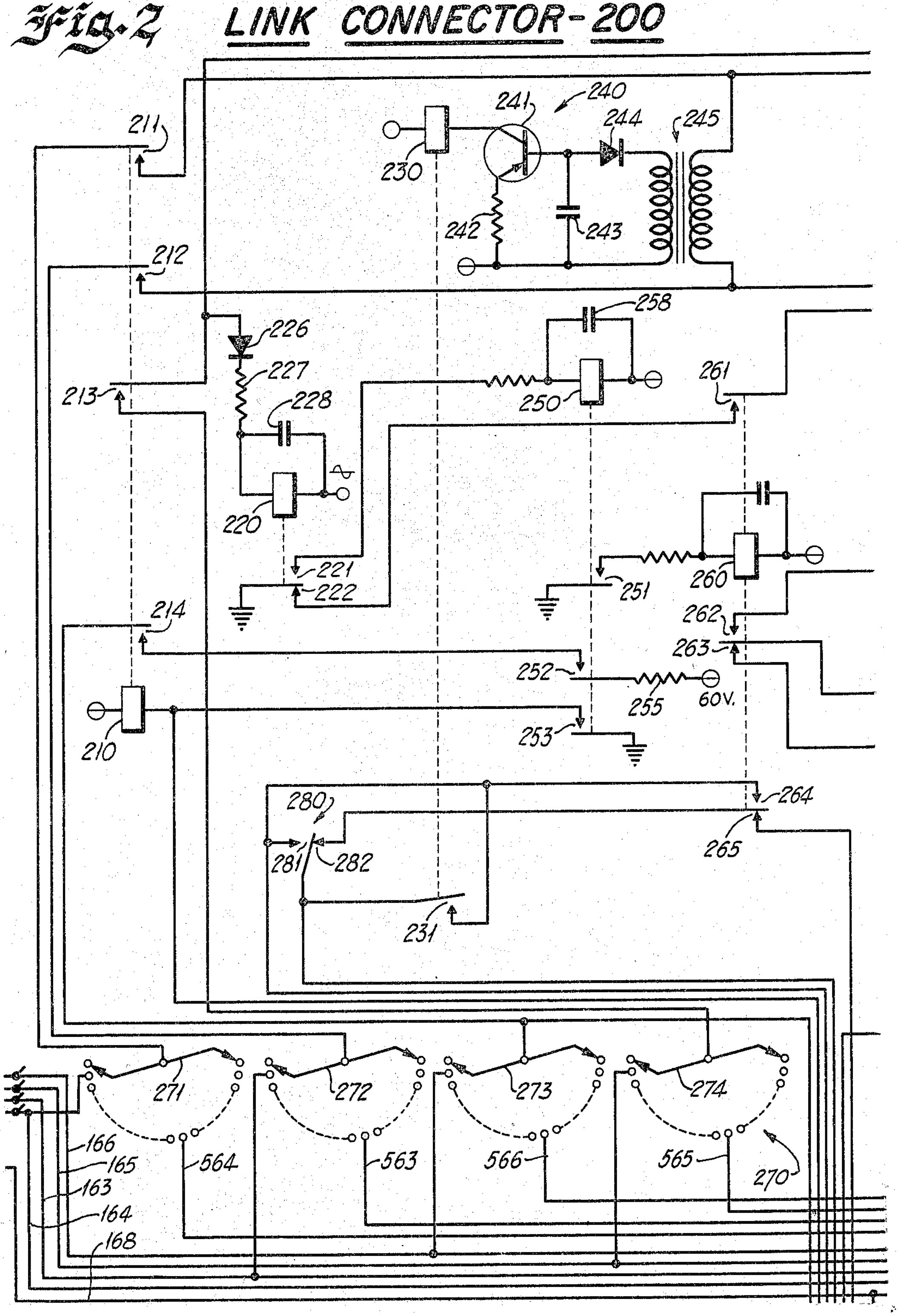
Figure 3:
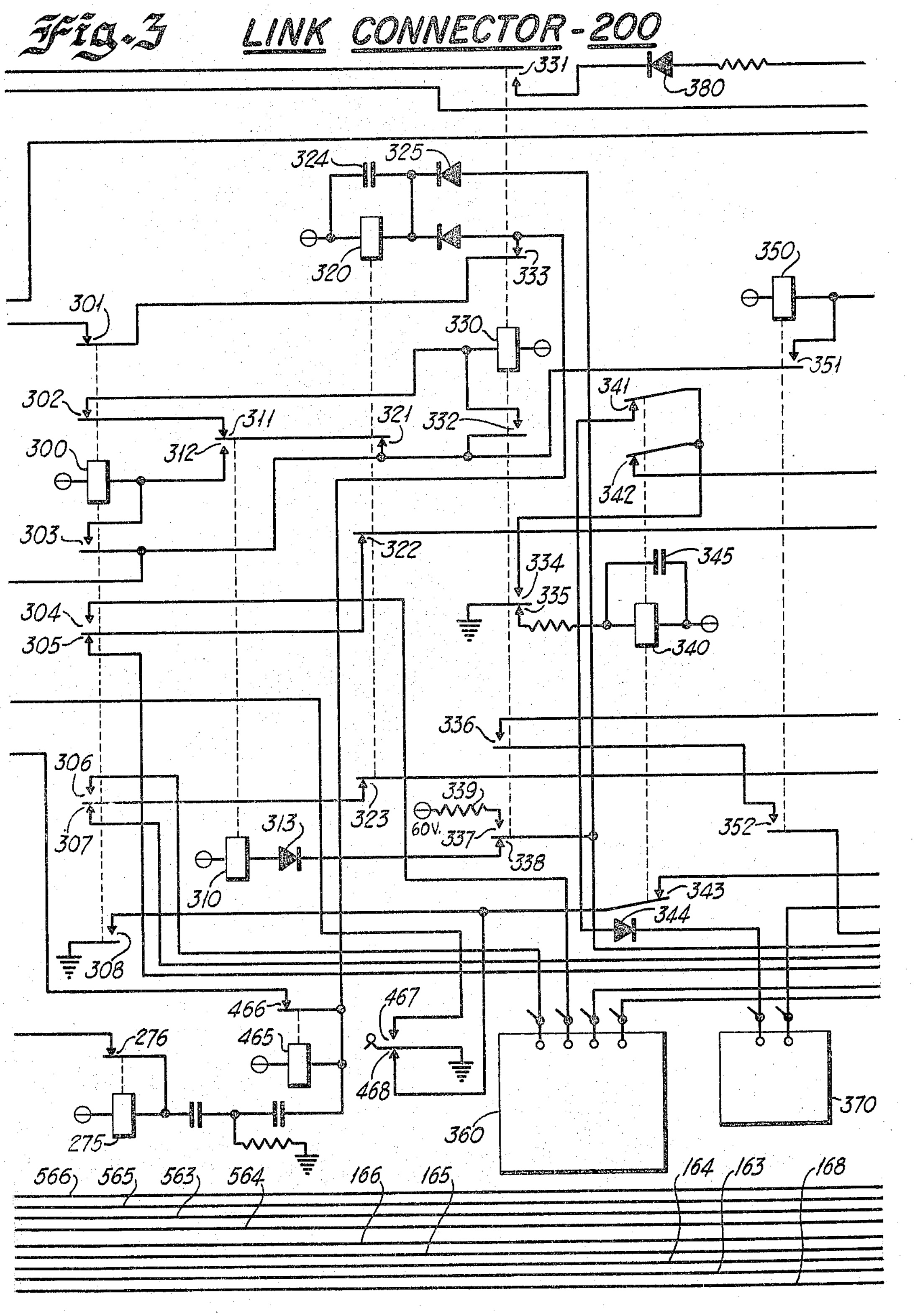
Figure 4:
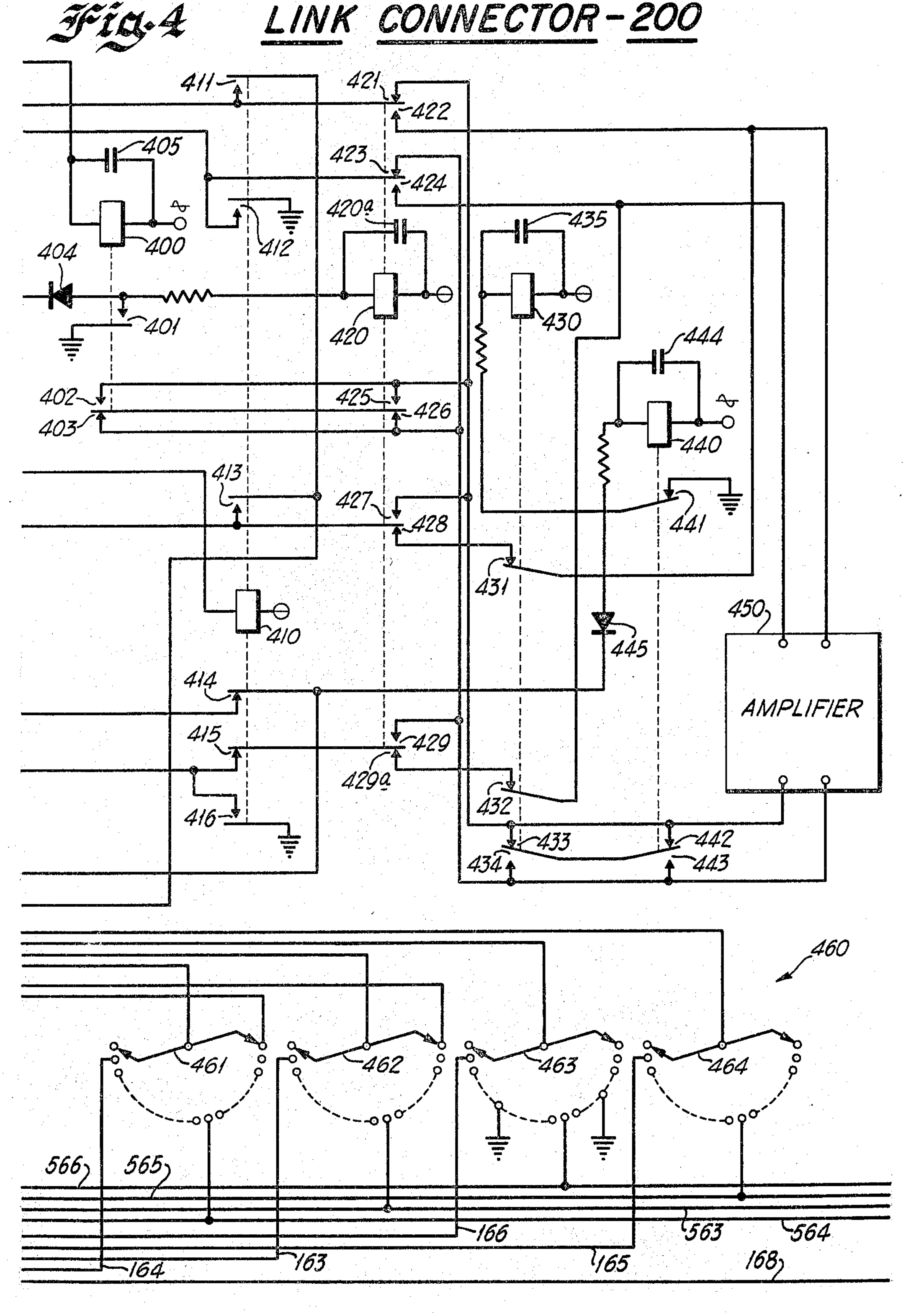

Referring now more specifically to FIGS. 1–6 of the drawings, therein is disclosed a dial controlled intercommunication system including a plurality of stations, such as a pair of stations 100 and 500, which are adapted to be connected for intercommunication by means of one of a plurality of link connectors, such as a link connector 200 (FIGS. 2–4). When a call is to be extended from, for instance, a calling station, such as the master station 100, to a called station, such as the station 500, the station 100 is placed in a calling condition to mark a line circuit 160 individual to the calling station 100 and to forward a start signal to an allotter or link distributor 600 (FIG. 6). The one of the links or link connectors, such as the link connector 200, that is idle and has been preassigned for use by the allotter 600 is placed in operation so that a finder switch 270 (FIG. 2) in the link 200 is placed in operation to search for and seize the line circuit 160 individual to the calling station 100. When the calling line circuit 160 and the connected calling station 100 are seized by the finder switch 270, the allotter 600 is actuated to search for and seize the next idle connector link and to preassign this link for use when the next calling condition arises. At this time, the calling station 100 is marked as busy.

At this time, the link 200 returns a dial tone to the calling station 100 to indicate that one or more digits representing the designation of the called station 500 can now be dialed. When the dialed digits are received by the link connector 200, the dial tone is removed and a connector switch 460 (FIG. 4) is advanced to a setting representing the received digits. A busy test is now made to determine whether the called station 500 is in a busy or idle condition. If the called station 500 is in a busy condition, a busy tone is returned to the calling station 100 to advise the calling party that the desired connection cannot be established. Alternatively, if the called station 500 is in an idle condition, a voice communication path is extended from the calling station 100 through a common amplifier 450 in the link connector 200 to the called station 500 through a line circuit 560 individual thereto.

When the voice channel or communication path from the calling station 100 to the called station 500 through the amplifier 450 is first completed, the amplifier 450 is conditioned to transmit signals from the calling station 100 to the called station 500. However, this path is interrupted in the link 200 to prevent a calling station from extending a completed communication path to a called station and eavesdropping at the called station. To render the communication channel effective, a talk-listen control in the calling station 100 must be operated to a talk position to permit the calling party to transmit a message to the called station 500 and then restored to a listen position. The link 200 includes means responsive to this initial operation and release of the talk-listen control means in the calling station 100 for permitting the talk-listen control at the called station 500 to establish a transmission path through the common amplifier means 450 from this called station. Thus, the party at the called station 500 can now converse with the calling station by actuation of his talk-listen control means. When the call has been completed, the seized link connector 200 and the communication path extending therethrough can be released under the control of only the calling station. This permits the link connector 200 to return to an idle condition in which it can be allotted under the control of the allotter 600.

The intercommunication system is designed for use with a variety of different types of stations, two of which are illustrated in FIGS. 1 and 5 of the drawings. The stations 100 and 500 comprise master stations and are identical with the exception that the station 100 includes a telephone handset 150 that is not provided in the station 500. Each of the stations 100, 500 is provided with an individual line circuit 160, 560, and the line circuits 160 and 560 are connected in common to all of the link connectors, such as the link connector 200.

The station 100 includes a bilateral electro-acoustical transducer 140 which is selectively conditioned for transmitting or receiving operations under the control of a talk-listen control means or key 110. A hold means or control key 120 is provided for initiating a call from the station 100 and, upon actuation, causes the interconnection of an idle link connector with the station 100 through the line circuit 160. Following the association of the calling station 100 and the link connector 200, a connection to a desired called station, such as the station 500, can then be established by operating a conventional telephone dialing device to transmit pulses representing from one to three digits. As indicated above, the station 100 also includes a telephone handset 150 comprising a conventional transmitter 151 and receiver 152 which are selectively connected to a voice transmitting channel under the control of a hook-switch assembly 153. The handset also includes a press-to-talk switching assembly 157 that normally conditions the devices 151 and 152 for receiving operations and which, when actuated, conditions these devices for transmission. The station 100 is connected to its line circuit 160 over a three conductor cable 167 including a pair of conductors 163 and 164 providing a voice channel and a single conductor 165 over which all control or supervisory operations are performed. If desired, the two voice conductors 163 and 164 could comprise one twisted wire pair, and the control conductor 165 could comprise one wire of another twisted pair, the other conductor of which can be used to carry the common ground signal.

The station 500 is identical to the station 100 with the exception that the station 500 does not include the telephone handset 150. To illustrate the similarity between the stations 100 and 500, identical reference numbers have been applied to these two stations except that in FIG. 5, the prefix digits "1" is replaced by the prefix digit "5."

Referring now more specifically to the link connector 200, this connector is one of a plurality of similar units including a finder switch 270 and a connector switch 460 whose contact banks are wired in multiple to all of the line circuits, such as the line circuits 160 and 560, in the system so that any one of the identical links can be assigned by the allotter 600 for use in extending a communication path between a calling and called pair of stations through the common amplifier means 450 in each of these links. The plurality of link connectors is also connected to a common tone source 360 providing dial tone and busy tone and an additional signal source 370 providing ring tone or signals.

Although the illustrated system is shown as including only the two stations 100 and 500, the link connectors such as the connector 200, have a switching capacity of up to 23 stations designated "1"–"9," "01"–"09," and and "001"–"005." The size of the system can be increased by increasing the switching capacity of the link connectors. In the system, the illustrated station 100 is assigned the designation "1" and the station 500 the designation "07." Thus, the station 100 is reached by dialing only the single digit "1," and the station 500 is reached by dialing "0" followed by the digit "7."

In the normal condition of an idle link connector, a plurality of relays 230, 340, 430, and 440 in the link 200 are in an operated condition. The relay 230 is maintained in an operated condition to open a pair of contacts 231 by a tone detector circuit 240. The relay 340 is normally maintained in an operated condition by a circuit extending to ground through a pair of normally closed contacts 335. In its operated condition, the relay 340 closes a plurality of contacts 341–343.

A pair of normally closed off-normal contacts 468 (FIG. 3) in the connector switch 460 forward ground through the closed contacts 343 to the cathode of a diode 445. The anode of this diode is connected through the operating winding of the relay 440 to a source of alternating current. Thus, when ground is applied to the cathode of the diode 445, the positive-going half cycles of the applied alternating current potential energize and operate the relay 440 and also charge a shunting capacitor 444 to maintain the relay operated during the negative half cycles of the applied alternating current potential.

When the relay 440 is operated, a plurality of contacts 441 and 442 are closed and a pair of contacts 443 are opened. The closure of the contacts 441 applies ground to the operating winding of the relay 430, which winding is shunted by a capacitor 435, to operate this relay. The operation of the relay 430 closes a plurality of contacts 431, 432 and 433 and opens a pair of contacts 434.

Assuming that a communication path is to be extended from the station 100 to the station 500, the system is placed in operation either by actuating the hold key 120 or by removing the handset 150 so that hook-switch assembly 153 is operated. When the hold key 120 is operated by pivoting the lever 120 in a clockwise direction, a pair of contacts 121 are closed to apply ground to the control conductor 165 over a circuit including a hold lamp 133, a pair of normally closed impulse springs 132 in the dialing device 130, and a diode 134. Similarly, when the hook-switch assembly 153 is actuated to close a plurality of contacts 154 and 156 and to open a pair of contacts 155, the closure of the contacts 156 forwards ground from the closed impulse springs 132 in the dialing device 130 through the diode 134 to the control conductor 165. The closure of the contacts 154 connects the voice conductor 164 to one input to the transmitter 151. The opening of the contacts 155 disconnects the transducer 140 from the conductor 164 by opening the circuit including a plurality of normally closed contacts 112 and 115 in the talk-listen switch 110. Thus, the operation of the hook-switch assembly 153 disables the transducer 140 and renders the handset 150 effective.

The ground applied to the control conductor 165 of the calling station 100 is forwarded through a resistance element 161 in the line circuit 160 individual to the station 100 and over a conductor 166 to mark the position of the calling station 100 in the bank of the finder switch 270 engaged by a wiper 273 with ground. The ground on the conductor 165 is also forwarded through the resistance element 161 and a diode 162 in the line circuit 160 to apply ground to a common start conductor 168 for the allotter 600. This ground is applied through a pair of normally closed contacts 651 in a thermal delay relay 650 to energize the winding of an allotter start relay 640, which winding is shunted by a capacitor 643. This completes the operating circuit for the allotter start relay 640 so that a pair of normally closed contacts 641 are opened and a pair of contacts 642 are closed.

The closure of the contacts 642 completes an operating circuit for a slow-to-release relay 630 which, in operating, closes a pair of contacts 631 to prepare an operating circuit for a motor magnet 667 in a stepping switch 660 in the allotter 600. The ground provided at the closed contacts 642 is also applied to a heating element 652 in the thermal delay relay 650 to initiate its heating cycle. The ground at the contacts 642 is also forwarded over a wiper 664 of the stepping switch 660, a pair of normally closed contacts 282 on a manually actuated switch 280, a pair of normally closed contacts 265, and another wiper 665 on the stepping switch 660 to complete an operating circuit for a relay 620.

In operating, the relay 620 closes a pair of contacts 621 to connect one terminal of the operating winding of a relay 610 to another wiper 662 of the stepping switch 660. The other terminal of the winding of the relay 610 is connected to a grounded negative potential source having a nominal value of 60 volts as contrasted to the conventional negative potential of around 48 volts used in the system. The wiper 662 is connected to the wiper 273 of the finder switch 270 in the allotted link connector 200. Since the finder switch 270 generally is not in the position individual to the calling line, an operating circuit for the relay 610 is not completed at this time.

The ground signal provided by the wiper 665 is also forwarded through a pair of normally closed contacts 611 on the relay 610, another wiper 661 on the stepping switch 660, and a pair of normally closed interrupter contacts 276 to the operating winding of the motor magnet 275 (FIG. 3) for the finder switch 270. This completes the energizing circuit for the motor magnet 275 so that it operates to open the contacts 276. When the contacts 276 are opened, the operating circuit for the motor magnet 275 is interrupted, and this magnet releases to advance the four wipers 271–274 of the finder switch 270 a single step.

Since the calling station 100 is assumed to be identified by the designation "1," the conductor 166 from the line circuit 160 individual to the calling station 100 is connected to the first contact in the bank engaged by the wiper 273. The marking applied to the conductor 166 by the line circuit 160 completes an operating circuit for the relay 610 to advise the allotter 600 and the link connector 200 that the calling line has been seized. More specifically, the cathode of the diode 162 in the line circuit 160 is connected to a nominal negative 48 volts through the winding of the start relay 640 in the allotter 600, and the anode of the diode 162 is connected to ground through the resistor 161 so that most of the voltage of the potential source connected to the winding 640 is dropped across the resistance element 161. However, the winding of the relay 610 is connected to the more negative 60 volt potential so that a potential on the order of 18 volts is applied across the winding of the relay 610 when the wiper 273 engages the contact individual to the calling line.

This operates the relay 610 to close a pair of contacts 612 and to open the contacts 611. The opening of the contacts 611 interrupts the above-identified circuit for supplying ground to the operating winding of the motor magnet 275. Thus, the finder switch 270 is stopped with the wipers 271–274 in engagement with the contacts connected to the conductors 164, 163, 166, and 165, respectively, of the line circuit 160 to interconnect the station 100 with the link connector 200. The closure of the contacts 612 forwards the ground provided by the wiper 665 over another wiper 663 of the stepping switch 660 to the operating winding of a relay 210 to operate this relay.

In operating, the relay 210 closes a plurality of contacts 211–214. The closure of the contacts 214 prepares a path for applying a busy marking signal to the wiper 273 of the finder switch 260 to mark the line circuit 160 and the connected station 100 as busy. The closure of the contacts 213 connects one terminal of the winding of a relay 220 and one terminal of a shunting capacitor 228 to the wiper 274 of the finder switch 270 over a circuit including the closed contacts 213, a diode 226, and a series resistor 227. Since the wiper 274 engages the contact in its bank that is connected to the grounded conductor 165, the relay 220 is operated by the negative-going half cycles of the alternating current potential connected to the other terminals of the winding 220 and the shunting capacitor 228. The capacitor 228 provides means for maintaining the winding of the relay 220 energized during the positive-going half cycles of the applied alternating current potential. The operation of the relay 220 opens a pair of contacts 222 and closes a pair of contacts 221 to complete an energizing circuit for the winding of a relay 250, which winding is shunted by a capacitor 258.

The operation of the relay 250 closes a plurality of contacts 251–253. The closure of the contacts 253 completes a holding circuit for the relay 210. The closure of the contacts 251 completes an operating circuit for a relay 260 so this relay operates to close a plurality of contacts 261, 262, and 264 and to open a plurality of contacts 263 and 265. The operations of the contacts 261–263 perform no useful function at this time. The closure of the contacts 264 marks the link connector 200 as busy in the banks of the switch 660 in the allotter 600. The opening of the contacts 265 interrupts the above-identified circuit for operating the relays 210 and 620, the relay 210 being held operated by the closed contacts 253. The release of the relay 620 opens the contacts 621 which, in turn, release the relay 610 to close the contacts 611 and to open the contacts 612. This partially restores the allotter 600 to a normal condition.

The closure of the contacts 264 or the closure of the contacts 252 when the relay 250 is operated prepare the allotter 600 for finding the next idle link connector and for preassigning this idle link for use when the next calling condition is established. Assuming that the station 100 is the only calling station at the time that the relays 250 and 260 are operated the closure of the contacts 252 forwards the high negative potential of 60 volts through a lower value resistance element 255, the closed contacts 214, and the wiper 273 of the finder switch 270 to the conductor 166 individual to the calling and seized line circuit 160. Because of the low value of the resistance 255, around 50 ohms, the potential applied to the anode of the diode 162 in the line circuit 160 is substantially 60 volts negative, and this potential biases the diode 162 in a reverse direction so as to reduce or terminate the flow of current through the winding of the start relay 640 in the allotter 600.

This releases the start relay 640 and serves to step the allotter 600 to its next position to release the seized link connector 200. More specifically, when the relay 640 is released, the contacts 642 are opened and the contacts 641 are closed. The closure of the contacts 641 forwards ground through the closed contacts 631 to energize the winding of a motor magnet 667 for the stepping switch 660. The opening of the contacts 642 interrupts the operating circuit for the slow-to-release relay 630 so that this relay releases after its delay interval to open the contacts 631 and terminate the energization of the motor magnet 667. When the motor magnet 667 is released, the wipers 661–666 of the switch 660 are advanced a single step to release the seized link connector 200.

The relays 630 and 640 in the allotter 600 can also be directly controlled from the calling station to release a link connector that fails to seize the calling line. If, for example, the link connector 200 fails to find the calling station 100, the hook-switch assembly 153 or the hold switch 120 can be momentarily released and then reoperated. This results in the momentary removal of ground from the start lead 168 through the diode 162 and releases and reoperates the relays 630 and 640. The sequential release of the relays 640 and 630 operates in the manner described to supply a single operating pulse to the motor magnet 667 to advance the switch 660 in the allotter 600. The hook-switch assembly 153 or the hold switch 120 can be operated and released until such time as a satisfactory connection is established.

In the event that the calling party fails to realize that the link connector 200 is not functioning to seize the calling station 100 and fails to release and reoperate the hold switch 120 or the hook-switch 153, the allotter 600 includes means for automatically advancing the stepping switch 660 to seize the following link connector. This operation is performed by the time delay relay 650. As described above, the energizing circuit for the heater element 652 is completed by the closure of the contacts 642. If the allotting operation has not been completed within the time delay period of the device 650 so that the operating circuit for the start relay 640 is interrupted, the contacts 651 are opened to interrupt this circuit. The relay 640 and the relay 630 now release in sequence to provide an operating signal for the winding of the motor magnet 667. This advances the switch 660 a single step.

Assuming that another calling condition exists when the relays 220, 250, and 260 are sequentially operated incident to the seizure of the calling station 100, the closure of the contacts 252 and the consequent application of the high negative potential to the anode of the diode 162 in the line circuit 160 individual to the calling station 100 biases the diode 162 in its reverse direction. However, the start relay 640 is held operated by the ground applied to the start lead 168 by the other calling line circuit. In this situation, the link allotter 600 is not advanced to release the seized link connector 200 until such time as the relay 260 is operated in the manner described above.

More specifically, when the relay 260 operates to close the contacts 264, the ground provided at the closed contacts 642 on the allotter start relay 640, which has been held operated, is forwarded over the wiper 664, the closed contacts 282 and 264, the wiper 666, and a pair of interrupter contacts 668 to operate the motor magnet 667. In operating, this magnet opens the contacts 668 to interrupt its operating circuit so that the magnet 667 releases to advance the wipers 661–666 a single step. If the link assigned to the next position of the switch 660 is also in a busy condition, as indicated by the closed contacts 264 in this next link connector, ground is reapplied through the closed contacts 668 to again operate and release the motor magnet 667 so that the wipers 661–666 are advanced an additional step. In this manner, the allotter 600 continues to advance until an idle link connector has been found for assignment to the other calling station. When an idle link connector has been assigned, the allotter 600 is restored to its normal condition in the manner described above.

As described above, the relay 210 is operated in response to advancing the finder switch 270 to the stepping position individual to the calling station 100. The closure of the contacts 211 and 212 when the relay 210 operates forwards dial tone to the calling station 100 to advise the calling party that the designation of the called station can be dialed. The dial tone provided by the tone or signal source 360 is forwarded over a pair of wipers 461 and 462 in the connector switch 460 and a plurality of normally closed contacts 305, 307, 322, 323, 415, 428, *429a*, 431, 432 to the input of the amplifier 450. The output from the amplifier is forwarded through a plurality of normally closed contacs 421, 423, 211, and 212, the wipers 271 and 272, and the conductors 163 and 164 to the line circuit 160 individual to the calling station 100. This dial tone is then forwarded to either the receiver 152 in the handset 150 over a path including the normally closed contacts 158 and the closed contacts 154 or to the winding 141 of the bilateral transducer 140 over a circuit including the closed contacts 155 in the hook-switch assembly 153 and a combination of open and closed contacts 111, 112 and 116 in the talk-listen key assembly 110. Upon receipt of the dial tone at either the receiver 152 or in the transducer 140, the party at the calling station 100 is audibly advised that the dialing of the designation of the called station can be initiated.

In the illustrative example assumed above in which the call is to be extended to the station 500 identified by the designation "07," the calling party first dials "0" followed by the digit "7" by manually operating the dialing device 130. As the dialing device 130 is operated incident to dialing "0," the shunt springs 131 are closed to bypass ground around the hold lamp 133 so that ground is applied directly to the impulse springs 132. When the springs 132 are first opened to provide the first of ten pulses, the ground signal applied to the conductor 165 is momentarily removed to interrupt the operating circuit for the relay 220 so that this relay releases to open the contacts 221 and to close the contacts 222. The relay 250 is not released by the opening of the contacts 221 because of the shunting capacitor 258.

The closure of the contacts 222 forwards ground through the closed contacts 261 and a plurality of normally closed contacts 301 and 332 to complete an operating circuit for a relay 320. This relay operates to open a plurality of contacts 321–323. The opening of the contacts 322 and 323 interrupts the above-identified circuit for applying a dial tone to the input of the amplifier 450 and thus removes dial tone from the calling station. The opening of the contacts 321 does not provide any useful function at this time.

The ground signal provided at the closed contacts 332 is also forwarded directly to the winding on the motor magnet 465 (FIG. 3) for the connector switch 460 to energize this magnet. When the first dial impulse is terminated by the reclosure of the springs 132 in the dialing device 130, the relay 220 is reoperated to again complete the operating circuit for the relay 250 and to open the operating circuit for the motor magnet 465 and the relay 320. The relay 320 does not release when the contacts 222 are opened because of a shunting capacitor 324. The release of the motor magnet 465 advances four wipers 461–464 on the stepping switch 460 to their first position and, in doing so, disconnects the wipers 461 and 462 from the dial tone provided by the tone source 360.

When the wipers 461–464 are advanced from their normal position, the pair of off-normal contacts 467 (FIG. 3) are closed and the off-normal contacts 468 (FIG 3) are opened. The opening of the contacts 468 innterrupts the above-described circuit for operating the relay 440 so that this relay releases to open the contacts 441 and 442 and to close the contacts 443. The opening of the contacts 441 interrupts the operating circuit for the relay 430 so that this relay releases to open the contacts 431 and 433 and to close the contacts 434. The opening of the contacts 431 and 432 interrupts an additional point in the circuit for connecting the wipers 461 and 462 of the connector switch 460 to the input of the amplifier 450.

The relay 220 forwards the remaining nine pulses produced by the dialing device 130 to the motor magnet 465 to advance the stepping switch 460 to its tenth position in which the wipers 461–464 engage the tenth contacts in their respective banks. In the tenth and twentieth poistions of the wiper 463, the contact engaged by the wiper is connected to ground so that an operating circuit for the relay 320 is completed through a diode 325 to maintain the relay 320 operated in the interdigit interval between the first and second or second and third dialed digits. The calling party then actuates the dialing device 130 to transmit seven pulses representing the second digit of the designation of the called station 500. These seven impulses advance the connector switch 460 seven additional steps so that the wipers 461–464 engage contacts connected to four conductors 563–566 individual to the line circuit 560 of the called station 500.

A test is now made over the wiper 463 of the connector switch 460 to determine the idle or busy condition of the called station 500. If the called station is in a busy condition, a negative potential of around 60 volts is applied to the conductor 566, and this potential is forwarded over the wiper 463 and through a pair of normally closed contacts 338 to energize and operate a relay 310, the other terminal of the winding of which is connected to a negative 48 volt potential. In operating, the relay 310 opens a pair of contacts 311 and closes a pair of contacts 312. The relay 320 releases following the second dialed digit and after the discharge of the capacitor 324 to close the contacts 321–323. The closure of the contacts 322 and 323 re-establishes another portion in the circuit for selectively connecting the wipers 461 and 462 and, thus, the voice connectors 563 and 564 of the called station 500 to the amplifier 450. The closure of the contacts 321 completes an operating circuit for a busy relay 300 extending from ground at the closed off-normal contacts 467 (FIG. 3) through the closed contacts 262, 321, and 312. In operating, the busy relay 300 opens a plurality of contacts 301, 302, 305, and 307 and closes a plurality of contacts 303, 304, 306, and 308. The closure of the contacts 303 completes a holding circuit for the busy relay 300 shunted around the contacts 312 and 321 in the operating circuit therefor.

The opening of the contacts 301 interrupts an additional point in the operating circuit for the relay 320 and the motor magnet 465 to prevent further operation of the connector switch 460. The closure of the contacts 308 forward ground through the closed contacts 343 to reoperate the relays 440 and 430 in sequence so that the transfer springs or swingers in the contacts 304, 305 and 306, 307 are connected to the input of the amplifier 450 over circuits including the closed contacts 322, 323, 415, 428, 429*a*, 431 and 432. Thus, when the contacts 304 and 306 are closed and the contacts 305 and 307 are opened, a busy signal is supplied from the tone or signal source 360 to the input of the amplifier 450. The output of this amplifier is connected to the two voice conductors of the calling station 100 over a circuit including the closed contacts 421 and 423, 211 and 212, and the wipers 271 and 272 of the finder switch 270. Thus, busy tone is now returned to the calling station 100 to advise the calling party that the called station 500 is in a busy condition. The system remains in this condition until such time as the connection is released.

When the calling station 100 releases the attempted call by either releasing the hook-switch assembly 153 or the hold switch 120, ground is removed from the signaling conductor 165 to interrupt the operating circuit for the relay 220 so that this relay releases to cause the sequential release of the relays 250 and 260. The release of the relay 250 causes the release of the relay 210, and the release of the relay 260 causes the release of the busy relay 300. The release of the relay 260 in closing the contacts 263, also prepares a circuit for stepping the connector switch 460 to its normal home position. This circuit extends from the closed and grounded contacts 467 through the closed contacts 263 and the interrupter contacts 466 to the winding of the motor magnet 465. When the motor magnet 465 is operated, the interrupter contacts 466 are opened to cause the release of the motor magnet 465 and the advance of the wipers 461–464 to the next position. This operation continues until such time as the connector switch 460 has been restored to its normal home position.

At this time, the contacts 467 are opened to interrupt the pulsing circuit for the magnet 465, and the contacts 468 are closed to maintain the relays 430 and 440 in an operated condition. The release of the relay 250, in opening the contacts 252, removes the busy marking signal from the control conductor 165 individual to the calling station 100 to indicate that this station is in an idle condition. The opening of the contacts 264 and the closure of the contacts 265 mark the link connector 200 as idle in the banks of the switch 660 in the allotter 600.

Assuming that the called station 500 is in an idle condition, the relay 310 and the busy relay 300 are not operated when the connector switch 460 is advanced to the position individual to the called line circuit 560. Accordingly, when the relay 320 times out in the period following the dialing of the second digit, the closure of the contacts 322 and 323 prepares circuits to the wipers 461 and 462 of the connector switch 460 for extending the voice channel to the called station 500, and the closure of the contacts 321 completes an operating circuit for a relay 330. This operating circuit extends from the winding of this relay through the closed contacts 302, 311, 321, 262 to ground to the closed off-normal contacts 467. In operating, the relay 330 closes a plurality of contacts 331, 333, 334, 336, and 337 and opens the contacts 335 and 338. The closure of the contacts 332 completes a holding circuit for the relay 330 shunted around the contacts 302, 311 and 321.

The opening of the contacts 332 interrupts one operating circuit for the relay 320, and the opening of the contacts 338 disconnects the relay 310 from the wiper 463 of the connector switch 460. The closure of the contacts 336 prepares a part of a circuit for connecting the wiper 464 and, thus, the control conductor 565 of the called station 500 with the operating winding of the relay 440. The closure of the contacts 337 connects the higher negative potential of 60 volts to the wiper 463 of the connector switch 460 so that the line multiple of the called station 500 is marked with the high negative potential indicating that the called station 500 is in a busy condition. Thus, the conductors 165 and 565 are marked in the banks of the connector and finder switches in all of the links with the higher negative potential indicating that the stations 100 and 500 are in a busy condition.

The closure of the contacts 331 prepares a circuit for controlling a pair of called station talk-listen control relays 400 and 420 in the link connector 200 from the calling station 100. More specifically, one terminal of the winding of the relay 400, which winding is shunted by a capacitor 405, is connected to an alternating current potential source, and the other terminal is connected through a diode 380 and the closed contacts 331 and 213 to the wiper 274 of the finder switch 270. This connection is further extended over the control conductor 165 to the calling station 100.

The opening of the contacts 335 interrupts the operating circuit for the relay 340 which is not released at this time because of the delay provided by a shunting capacitor 345. The closure of the contacts 334 forwards ground through the closed contacts 342 to complete an operating circuit for a relay 410 so that this relay operates to close a plurality of contacts 411-413 and 416 and to open the contacts 414 and 415. The opening of the contacts 414 interrupts one points in an incomplete circuit for controlling the operation of the called station talk-listen relays 440 and 430. The opening of the contacts 415 interrupts an additional point in an incomplete circuit for connecting the wiper 462 of the connector switch 460 to one side of the input amplifier 450. The closure of the contacts 411 and 412 connects the voice conductor 164 of the calling station 100 to the ring signal source 370 and grounds the other voice conductor 163 of the calling station 100. In a similar manner, the closure of the contacts 413 and 416 connects one of the voice conductors 564 of the called station 500 to the ring signal source 370 and grounds the other voice conductor 563 of the calling station 500. This prepares the link connector 200 for applying a ringing signal to the calling station 100 and the called station 500.

When the relay 330 is operated, as described above, the closure of the contacts 334 also forwards ground through the closed contacts 341 and a diode 344 to provide a start ground to the ring signal source 370 so that intermittent pulses of energy are applied to the conductors 164 and 564 of the calling and called stations 100 and 500. Since the other conductors 163 and 563 of the voice channels are connected to ground, either the receiver 152 or the transducer 140 and the bilaterial transducer 540 in the stations 100 and 500 are supplied with a burst of oscillatory energy that is audibly reproduced as a buzz to advise the called station 500 of the call and to notify the calling station 100 that the station 500 is being signaled.

After the time delay period of around one second for the relay 340 has expired, the discharge current of the capacitor 345 is no longer sufficient to maintain the relay 340 in an operated condition. This relay releases to open the contacts 341-343. The opening of the contacts 343 interrupts an additional point in the open operating circuit for the relay 440, and the opening of the contacts 341 removes start ground from the source 370 to terminate the application of the ring signal to the calling and called stations 100 and 500. The opening of the contacts 342 interrupts the operating circuit for the relay 410 so that this relay releases to disconnect the source 370 from the conductors 164 and 654 of the calling and called line circuits and to remove the ground from the conductors 163 and 563. The link connector 200 remains in this condition until either the talk-listen key assembly 110 or the press-to-talk switching assembly 157 in the calling station 100 is operated to a setting enabling transmission from the calling station to the called station 500. By disabling transmission between the stations 100 and 500 until the calling station has been conditioned for transmission, eavesdropping is prevented.

More specifically, transmission from the called station 500 to the calling station 100 cannot be accomplished without the called station talk-listen control relays 430 and 440 in the link connector 200 being in an operated condition. The only remaining operating circuit for the released relay 440 extends through a pair of normally open contacts 352 on a relay 350 which is now released and which will remain in a released condition until such time as the calling station talk-listen control relays 400 and 420 have been operated at least once.

Accordingly, the calling party at the calling station 100 actuates either the press-to-talk switching assembly 157 or the talk-listen assembly 110 to a talk position. If the press-to-talk switching assembly 157 is actuated to open the contacts 158 and to close a pair of contacts 159, the opening of the contacts 158 removes a short circuit from across the transmitter 151, and the closure of the contacts 159 applies ground to the cathode of a diode 119, the anode of which is connected to the control conductor 165. Similarly, if the talk-listen assembly key 110 is actuated to a talk setting, the contacts 112 are opened and the contacts 111 and 113 are closed. The opening of the contacts 112 disconnects the tap on the potentiometer 142 from the winding of the transducer 140, and the closure of the contacts 111 connects the winding 141 directly to the other conductor 164 of the voice channel to remove the impedance of the potentiometer 142 from the voice transmission path. The closure of the contacts 113 applies ground to the cathode of the diode 119 and, thus, to the control conductor 165.

This control conductor is connected over the above-identified circuit to one terminal of the relay 400 in the link connector 200, the other terminal of which is supplied with an alternating current potential. Thus, the relay 400 is operated on the positive-going half cycles of the applied potential and is retained operated during the negative-gating half cycles by the shunting capacitor 405. When the relay 400 operates, a pair of contacts 403 are opened and a plurality of contacts 401 and 402 are closed. The opening of the contacts 403 provides no useful function at this time, but the closure of the contacts 402 applies a short circuit across the output of the amplifier 450 to prevent the transmission of clicks or other switching noises.

The closure of the contacts 401 completes an operating circuit for the relay 350. In operating, the relay 350 closes the contacts 351 and 352. The closure of the contact 351 completes a holding circuit for the relay 350 extending to ground at the off-normal contacts 467 of the connector switch 460 through the closed contacts 262. The closure of the contacts 352 connects the winding of the called station talk-listen control relay 440 over the wiper 464 of the connector switch 460 to the control conductor 565 of the called station 500 to prepare the relays 440 and 430 for control from the called station 500.

The closure of the contacts 401 also operates the relay 420 to open the contacts 421, 423, 426, 428 and **429*a* and to close a plurality of contacts 422, 424, 425, 427 and 429. The contacts 421-424 disconnect the output of the amplifier 450 from the calling station voice conductors 163 and 164 and connect these conductors to the input of the amplifier 450. The contacts 425 and 426 remove the short circuit from the output of the amplifier 450, and the contacts 427-429*a* disconnect the voice conductors 563 and 564 of the called station 500 from the input of the amplifier 450 and connect them to the output of this amplifier. The calling station 100 can now transmit through the amplifier 450 to the transducer 540 in the called station 500**.

When the press-to-talk switching assembly 157 is released or the talk-listen key assembly 110 is restored to its normal or listen position, the operating circuit for the relay 400 is interrupted, and this relay and the slaved relay 420 release. The release of these relays controls the contacts 402, 403, 425, and 426 to apply a momentary shunt to the output of the amplifier 450. The relay 350 does not release because of the prior completion of a holding circuit therefor at the closed contacts 351. The relay 350 remains operated to enable control of the relays 430 and 440 from the called station 500 and provides an indication that the link connector 200 has been conditioned for transmission from the calling station to the called station at least once subsequent to the establishment of the connection.

When transmission is to be made from the called station 500 to the calling station 100, the talk-listen key assembly 510 is actuated to its talk position to open the contacts 512 and to close the contacts 511 and 513. The contacts 511 and 512 connect the winding 541 of the bilateral transducer 540 directly across the voice channel conductors 563 and 564 and remove the impedance of the potentiometer 542 when the transducer 540 is to be used as a transmitter. The closure of the contacts 513 apply ground through the diode 519 to the control conductor 565 to complete a circuit extending over the wiper 464 and the closed contacts 352, 336 and 414 and the diode 445 for operating the relay 440.

The operation of the relay 440 closes the contacts 441 and 442 and opens the contacts 443. The closure of the contacts 442 applies a short circuit across the output of the amplifier 450 and the closure of the contacts 441 completes the operating circuit for the relay 430 so that this relay operates to close the contacts 431–433 and to open the contacts 434. The contacts 433 and 434 remove the short circuit from the output of the amplifier 450, and the closure of the contacts 431 and 432 connects the voice channel conductors 563 and 564 of the called station 500 to the input of the amplifier 450. The output of the amplifier is connected to the voice conductors 163 and 164 of the calling station 100 through the contacts 421 and 423 which were closed by the release of the calling station talk-listen control relay 420. The link connector 200 is now conditioned for transmission through the amplifier 450 from the called station 500 to the calling station 100. When transmission is to be made in a reverse direction, the talk-listen key assembly 510 and the called station 500 is restored to its listen position to relase the relays 430 and 440, and either the press-to-talk switching assembly 157 or the talk-listen key assembly 110 in the called station 100 can then be operated in the manner described above.

The calling station talk-listen relays 400 and 420 and the called station talk-listen relays 430 and 440 are so arranged that the calling station relays 400 and 420 have precedence over the called station relays 430 and 440 in the event that the key assemblies 110 and 510 in the calling and called stations are simultaneously operated to a talk setting. When the relays 400 and 420 are operated by the talk-listen switch means 110 in the calling station 100, the contacts 421–424 and **427–429*a* connect the input of the amplifier 450 to the calling station 100 and the output of this amplifier to the called station 500 regardless of the operated or released condition of the relays 430 and 440. Thus, even though the relays 430 and 440 are operated by actuating the called station talk-listen key assembly 510 to its talk setting, the amplifier 450 in the seized link connector 200 is conditioned to transmit from the calling station 100 to the called station 500**.

At the termination of the conversation, the seized link connector 200 in the established voice channel can be released only under the control of the calling station 100. More specifically, when either the hook-switch assembly 153 or the hold switch assembly 120 is released to open the contacts 156 or 121, respectively, the anode of the diode 134 is disconnected from ground, and the relay 220 is released in the manner described above when a busy called station circuit condition existed to cause a sequential release of the relays 250, 210, and 260. As described above, the release of these relays removes the busy marking from the line multiples of the line circuit 160 and marks the link connector 200 in the allotter 600 as being in an idle condition. The release of these relays also causes the connector switch 460 to return to its home position under the control of the motor magnet 465 and the interrupter contacts 466 so that the off-normal contacts 467 are opened and the off-normal contacts 468 are closed. The opening of the contacts 467 causes the release of the relays 330 and 350, and the release of the relay 330 causes the reoperation of the relay 340. The reoperation of the relay 340 together with the closure of the off-normal contacts 468 causes the reoperation of the relays 440 and 430 so that the link connector 200 is restored to its normal condition.

The stations in the system can also be placed in a "hands-free" condition in which it is not necessary to actuate the talk-listen key assemblies 110, 510 or the press-to-talk switching assembly 157 to permit communication between the calling and called stations. Assuming that the party at the station 500 desires "hands-free" operation in which it is not necessary to actuate the talk-listen key assembly 510 each time that the direction of communication through the amplifier 450 is to be reversed, the talk-listen assembly 510 is actuated to an idle position in which the contacts 514 and 516 are closed and the contacts 515 are opened. The contacts 515 and 516 connect the winding 541 of the bilateral transducer 540 directly across the voice conductors 563 and 564 of the station 500 to remove the impedance on the potentiometer 542. The closure of the contacts 514 applies continuous ground to the control conductor 565 through a monitor lamp 518 and the diode 519. Thus, ground is standing on the control conductor 565.

Assuming that a call is to be extended from the station 100 to the station 500, the link connector 200 is seized in the manner described above and operated to extend the connection over the connector switch 460 to the conductors 563–566 of the line circuit 560 in the manner described above. When the talk-listen key assembly 110 is first operated to its talk position to operate the relays 400 and 420, the relay 350 is operated in the manner described to close the contacts 352. However, the operating circuit for the relay 440 is immediately completed to operate this relay and the relay 430 because of the ground signal continuously applied to the conductor 565 through the diode 519. The lamp 518 is illuminated concurrently with the operation of the relays 430 and 440 to provide a visible indication to the party at the called station 500 that conversation at the called station can be monitored from the calling station 100. The operated condition of the relays 430 and 440 does not prevent communication from the calling station 100 to the called station 500 because the relays 400 and 420 control the direction of transmission through the amplifier 450 in the manner described above. However, when the calling station talk-listen key assembly 110 is restored to its listen position, the relays 400 and 420 are released, and the operated relays 430 and 440 permit communication from the called station 500 to the calling station 100 without requiring actuation of the key assembly 510. The system is restored to a normal condition from the calling station in the same manner described above.

FIG. 7 of the drawings illustrates a modified station 700 capable of providing "hands-free" operation in the same manner as the stations 100 and 500 but which does not include a dialing device 130, 530 or the switching assemblies used in the station 100 and 500. To illustrate the similarities between the components in the circuits 100, 500, and 700, the same reference numbers are used except that the prefix digits "1" and "5" are replaced with the prefix digit "7."

In general, the "hands-free" station 700 includes a bilateral transducer 740 having an operating winding 741, one terminal of which is connected to one terminal of a potentiometer 742 and to one of the voice conductors 763. The other voice conductor 764 is connected to the other terminal of the potentiometer 742, and the tap thereon is connected to the other terminal of the winding 741. Thus, the bilateral transducer 740 is continuously connected to the voice channel provided by the conductors 763, 764 with an adjustable volume control provided by the potentiometer 742. The single control conductor 765 for the station is connected to a diode 719, the cathode of which is connected to ground. Thus, the control conductor 765 is continuously supplied with a ground potential that is effective to cause the operation of the called station talk-listen control relays 430 and 440 in a seized link connector as soon as a connection between this connector and the station 700 has been completed. However, the direction of transmission through the amplifier 450 is controlled by the position of the talk-listen key assembly 110, 510 in the calling station in the manner described above. The conductors 763–765 are connected to an individual line circuit identical to the line circuits 160 and 560 over a cable 767.

The link connector 200 includes means for continuously monitoring the operability of the amplifier 450 during the periods in which the link connector 200 is not in use. In the event that a malfunction or an inoperative condition arises in this amplifier, the link connector 200 is placed in a busy condition to prevent the allotter 600 from assigning this link for use in extending a connector from a calling station. This monitoring means is also effective to prevent seizure of the link connector in the event of the failure of one of the tone sources in the signal source 360. This monitoring means is provided by the detector 240 which controls the operation of the relay 230 and which is continuously connected to the dial tone signals provided by the source 360.

More specifically, in the normal condition of the link connector 200, the dial tone provided by the source 360 is forwarded over the wipers 461 and 462 of the connector switch 460 in its normal position through the normally closed contacts 305, 307, 322, 323, 415, 428, **429*a*, 431, and 432 to the input of the amplifier 450. The output of the amplifier is connected through the normally closed contacts 421 and 423 to the primary winding of a transformer 245 that is bridged across the output of the amplifier 450. The secondary winding of the transformer 245 is connected across a capacitor 243 by a diode 244 which permits the capacitor 243 to charge to a potential. This potential is applied across the emitter and base electrodes of a transistor 241 in series with an emitter resistance 242** to bias the base electrode negative with respect to the emitter.

This places the transistor 241 in a conductive condition to continuously energize the winding of the relay 230 so that this relay is held in a normally operated condition with the contacts 231 in an open condition. If the dial tone source fails or the amplifier 450 falls, the charging potential for the capacitor 243 is interrupted, and the charge on this capacitor leaks off through the transistor 241 to the point at which the base is no longer held in a negative potential relative to its emitter. At this time, the transistor 241 is rendered nonconductive to release the relay 230. In releasing, the relay 230 closes the contacts 231 so that the related contact in the bank of the switch 660 in the allotter 600 engaged by the wiper 664 is directly connected to the related bank contact engaged by the wiper 666 of the switch 660.

If the start relay 640 in the allotter 600 is operated to close the contacts 642 when the stepping switch 660 is in a position individual to a link connector in which the relay 230 is released, the ground provided at the closed contacts 642 is forwarded over the wiper 664, the closed contacts 231, the wiper 666, and the interrupter contacts 668 to the operating winding of the motor magnet 667. This pulses the motor magnet to advance the switch 660 a single step to release the link connector in which an improper operating condition has been established. In this manner, the allotter 600 is controlled to prevent the assignment of an inoperative link connector to a calling station.

The dial tone supplied by the source 360 is removed from the primary winding of the transformer 245 by the operation of the relay 320 to open the contacts 322 and 323 when the first dial pulse is received from a calling station. Further, when the connector switch 460 responds to the dial impulses and advances the wipers 461 and 462 from a normal home position, the path for normally applying dial tone to the transformer 245 is interrupted for the duration of the established connection. Thus, the detector 240 will release the relay 230 during the extension of each call. However ,the contacts 231 which are closed by the release of the relay 230 are connected in parallel with the contacts 264 which are closed by the operation of the relay 260 incident to the seizure of the link connector 200 by a calling station. Therefore, the release of the relay 230 during the extension of a call does not adversely affect the operation of the link connector 200.

In the event that the link connector 200 is to be manually busied out to permit service or other operations, the manually actuated switch 280 is provided. When the link connector 200 is to be placed in a busy condition, the switch 280 is operated to open the contacts 282 and to close a pair of contacts 281 which are connected in parallel with the contacts 231. Thus, the closure of the contacts 281 prevents the seizure of the link connector 200 by the allotter 600 in the manner described above.

Although the present invention has been described with reference to a single illustrative embodiment thereof, it should be understood that numerous other modifications can be devised by those skilled in the art that will fall within the spirit and scope of this invention.

What is claimed as new and desired to be secured by Letters Patent of the United States is:

1. In a communication system, a calling station, a called station, link means disposed between the calling and called stations and including both common amplifier means and finder means for extending a connection to the calling station, a signaling channel individual to the calling station and selected by the finder means to connect the calling station to the link means, first means responsive to signals of one polarity applied to the signaling channel for controlling the selection of said channel by the finder means, and second means connecting means for interconnecting the link means and the called station, responsive to signals of an opposite polarity applied to the channel for controlling the transmission of signals between the calling and called stations through the amplifier means.

2. In a communication system, a plurality of stations each having an individual voice channel and a signaling conductor, link means common to the stations and including both amplifier means and switching means, first means responsive to signals of one polarity applied to the signaling conductor of a calling station for controlling the switching means to connect the voice channel of the calling station to the link means, connecting means for interconnecting the link means and the called station, and second means responsive to signals of the opposite polarity applied to the signaling conductor of the calling station for controlling the operability of the amplifer to transmit signals to and from the voice channel of the calling station.

3. The communication system set forth in claim 2 including a plurality of link means common to all of the stations, link distributor means for allotting the link means for use in extending connections to calling stations, and means responsive to the application of a direct current potential to the signaling conductor of the calling station for placing the allotter means in operation.

4. The communication system set forth in claim 2 including means in the link means for applying a direct current potential to the signaling conductor of the calling station for marking the calling station as busy.

5. In a communication system, a plurality of stations, each having both an individual voice channel and a signaling conductor, link means common to the stations and including first and second switch means, first means responsive to direct current signals applied to the signaling conductor of one station for controlling the first switching means to establish a connection between the link means and the voice channel of said one of the stations, and second means responsive to undulating signals applied to the signaling conductor of the one station for controlling the second switching means to establishing a connection between the link means and the voice channel of a second one of the stations.

6. In a communication system, a plurality of stations each having a voice channel and a signaling conductor, link means common to the stations for connecting a calling station to a called station, said link means including switching means and amplifier means, first means controlled over the signaling conductor from the calling station and responsive to signals of a given polarity for controlling the operation of the switching means to select the voice channel individual to the calling station, connecting means for connecting the link means to the voice channel and signalling conductor of the called station, and second means controlled over the signaling conductors from the calling and called stations and responsive to signals of an opposite polarity for controlling the transmission of signals through the amplifier means between the voice channels of the calling and called stations.

7. In a communication system, a plurality of stations each having both an individual voice channel and a signaling conductor, link means common to the stations and including first and second switch means, first means responsive to direct current signals applied to the signaling conductor of one station for controlling the first switching means to establish a connection between the link means and the voice channel of a first one of the stations, and second means responsive to alternating current signals applied to the signaling conductor of the one station for controlling the second switching means to establish a connection between the link means and voice channel of a second of the stations, amplifying means in the link means common to the voice channels in all of the stations, and means controlled over the signaling conductors of the first and second stations for controlling the transmission of signals through the amplifying means between the voice channels of the first and second stations.

8. The communication system set forth in claim 7 including means in the link means for applying a direct current potential of a different value to the signaling conductors of the first and second stations to mark the first and second stations as busy.

9. In a communication system, a plurality of stations, link means for establishing a communication path between a calling station and a called station, said link means including amplifier means and station selecting means, relay means in said link means for controlling the operation of the amplifier means and the selecting means, said relay means including at least a pair of relay windings, each being connected in series with an alternating current potential source, a pair of oppositely poled diodes each in series with one of said relay windings, and means for controlling the operation of the relay means including switching means at each of the stations for connecting the relay windings to a point of reference potential through said oppositely poled diodes.

10. In a communication system, a plurality of stations, link means including amplifier means common to all of the stations and including means for selectively extending a communication path through said amplifier means between a pair of the stations, a signal source, means connecting the signal source to the input of the amplifier means during the intervals in which the link means is not in use as a part of a communication path, and detecting means connected to the output of the amplifier means and operable to produce an indication when the amplifier means fails while the link means is not in use.

11. In a communication system, a plurality of stations, link means including amplifier means common to all of the stations and including means for selectively extending a communication path through said amplifier means between a pair of the stations, a signal source, means connecting the signal source to the input of the amplifier means during the intervals in which the link means is not in use as a part of a communication path, means in the link means operated when the link means is placed in use to extend a communication path for disconnecting the signal source from the amplifier means, and signal responsive means controlled by signals from the output of the amplifier means for producing an indication of a failure of the amplifier means during the interval in which the signal source is connected to the input of the amplifier means.

12. In a communication system, a calling station, a called station, a plurality of link means for extending a communication path from the calling station to the called station, amplifier means in each of the link means having an input and an output, a signal source for supplying signals to the inputs of the amplifier means, a signal responsive means in each of the link means controlled by signals from the output of the amplifier means, and means controlled by the signal responsive means for disabling the link means in which the amplifier means become inoperative.

13. In a communication system, a calling station, a called station, a plurality of link means for extending a communication path from the calling station to the called station, amplifier means in each of the link means having an input and an output, a signal source for supplying signals to the inputs of the amplifier means, a signal responsive means in each of the link means controlled by signals from the output of the amplifier means, allotter means for selecting the link means for use in extending communication paths between the calling and called stations, and means controlled by the signal responsive means for preventing the selection by the allotter means of a link means in which the amplifier means is inoperative.

14. In a communication system; a calling station; a called station; link means providing a voice communication path between the calling and called stations; amplifier means in said link means and forming a part of the communication path between the calling and called stations; means for seizing the link means and for controlling the link means to establish the voice communication path between the calling and called stations; and testing means for checking the operation of the amplifier means, said testing means including a signal source continuously connected to the input of the amplifier means during periods in which the link means is not used in a communication path, and signal responsive means connected to the output of the amplifier means for producing an indication when the amplifier means fails.

15. In an intercommunication system, a calling station, a called station, amplifying means interconnecting the calling and called stations, signal transmitting and receiving means in each of the stations, talk-listen control means in each of the stations for conditioning the signal transmitting and receiving means for talk and listen operations and for conditioning the amplifying means for signal transmission in opposite directions between the calling and called stations, and control means for normally preventing operation of the amplifying means to transmit from the called station to the calling station, said control means being effective to permit the amplifying means to transmit from the called station to the calling station only in response to operation of the talk-listen control means in the calling station to a talk position and then to a listen position.

16. In a communication system, a calling station, a called station, connecting means for establishing a communication path between the calling and called stations; common amplifier means in the connecting means included in the communication path and having an input and an output, relay means in said connecting means controlled from the calling and called stations for controlling the selective connection of the calling and called stations to the input and output of the amplifier means, and silencing means including contact means operated in sequence by said relay means for applying a momentary short circuit to the amplifier means each time that the selective connections to the amplifier means are changed by the relay means.

17. The communication system set forth in claim 16 in which the relay means includes a first relay and a second relay operated in a timed sequence and in which the silencing network includes first contact means closed by the operation of the first relay and connected in series with the second contact means opened by the operation of the second relay.

18. A communication system as claimed in claim 9 further comprising an additional pair of oppositely poled diodes at each of the stations, said switch means being effective selectively to connect said windings to the point of reference potential through a selected one of said second pair of diodes.

References Cited by the Examiner

UNITED STATES PATENTS

| | | | |
|---|---|---|---|
| 2,146,362 | 2/1939 | Thomsen | 179—1.4 |
| 2,266,503 | 12/1941 | Long et al. | 179—27.3 |
| 2,662,115 | 12/1953 | Campbell | 179—1.4 |
| 2,715,158 | 8/1955 | Hall | 179—18.7 |
| 2,908,763 | 10/1959 | Sladek | 179—18.7 |
| 3,023,281 | 2/1962 | Schmidt | 179—175.2 |
| 3,134,857 | 5/1964 | Kolbinger | 179—18.3 |

KATHLEEN H. CLAFFY, *Primary Examiner.*

ROBERT H. ROSE, *Examiner.*

L. WRIGHT, *Assistant Examiner.*